Dec. 13, 1938.  C R. HANNA  2,140,357
SHOCK ABSORBER
Filed July 17, 1931

WITNESSES:
C. J. Weller
George V. Woodling

INVENTOR
Clinton R. Hanna.
BY W. R. Coley
ATTORNEY

Patented Dec. 13, 1938

2,140,357

UNITED STATES PATENT OFFICE 2,140,357

SHOCK ABSORBER

Clinton R. Hanna, Pittsburgh, Pa.

Application July 17, 1931, Serial No. 551,390

35 Claims. (Cl. 188—88)

My invention relates generally to shock absorbers and particularly to shock absorbers for vehicles.

In the following description, the operation of my invention will be described in connection with a vehicle, although it is to be understood that it may be utilized in connection with other apparatus having relatively movable masses connected by a resilient member.

Also, in this description, the vehicle may be considered as having two parts which may, in the interest of clarity, be conveniently referred to as the sprung and the unsprung masses. The sprung mass comprises that part of the vehicle which is supported by the springs and the unsprung mass comprises the axle and wheels and any other parts that may be mounted thereon.

An object of my invention is to provide for resisting the relative movements of the sprung and the unsprung masses of a vehicle in order to insure smooth and improved riding qualities of the sprung mass.

A more specific object of my invention is to provide for resisting the relative movements of the sprung and the unsprung masses of a vehicle by a force that is proportional to the rate of change of the vertical velocities of one of the masses.

A further object of my invention is to provide for resisting the relative movements of the sprung and the unsprung masses of a vehicle with a force that is determined by the rate of change of the increasing vertical velocities of the sprung mass, said force being large when the rate of change is large and small when the rate of change is small.

Another object of my invention is to provide for resisting the relative movements of the sprung and the unsprung masses of the vehicle with a relatively small force during the periods when the vertical velocities of the sprung mass is constant or decreasing.

It is also an object of my invention to provide for reducing the frequency of the free oscillations of the sprung mass of a vehicle, whereby it is less likely to be influenced by the undulations of the road surface.

A still further object of my invention is to provide for resisting the relative movements of the sprung and the unsprung masses of a vehicle by a force that is a predetermined large fraction of every force tending to increase the vertical velocity of the sprung mass, thereby leaving only a predetermined small fraction to accelerate the sprung mass.

Further objects of my invention will hereinafter become apparent.

Figure 3:
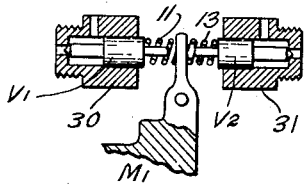
Figure 1:
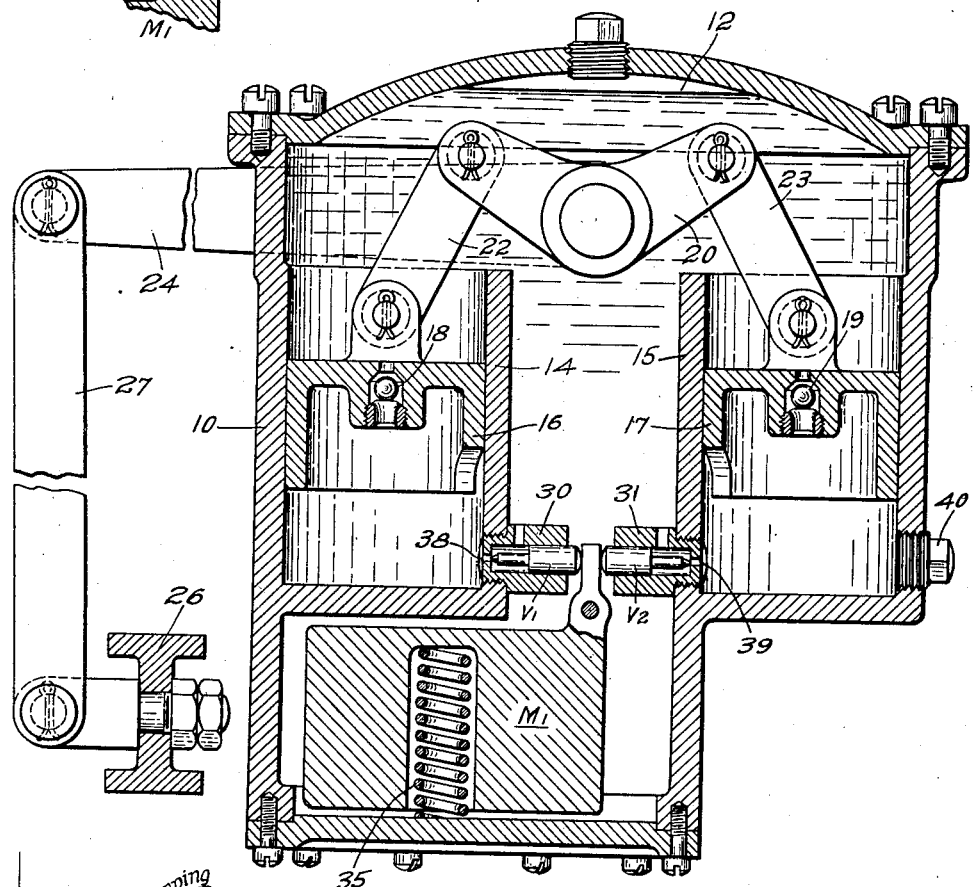
Figure 2:
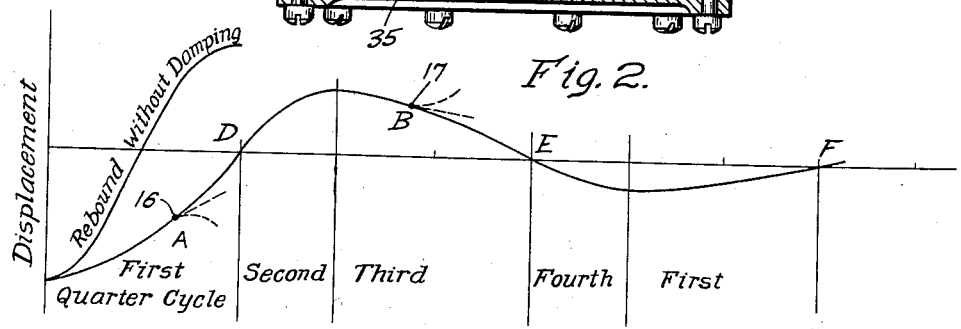

For a fuller understanding of the nature and objects of my invention, reference should be had to the following detailed description, taken in connection with the accompanying drawing, in which Figure 1 is a view, in vertical section, of a shock absorber embodying the features of my invention, Fig. 2 is a curve that graphically shows the manner in which a shock absorber, constructed in accordance with my invention functions, Fig. 3 is a detail sectional view of a modified structure of the inertia-controlled valves wherein springs are utilized to provide a small substantially constant resisting force when the vertical velocities of the sprung mass is constant or decreasing.

Referring now to the drawing, the reference character 10 designates a housing in which the shock absorber fluid is retained and in which the various mechanical parts of the shock absorber are mounted. As shown, the level of the fluid is indicated by the line 12.

In this instance, it has ben deemed unnecessary to show the manner in which the housing may be attached to the vehicle, since the general construction of such supporting structures is a matter of common knowledge.

Integrally formed with the housing are two cylinders 14 and 15 in which pistons 16 and 17 are respectively mounted. Ball check valves 18 and 19 are provided in the tops of the pistons whereby the fluid may freely enter the piston chambers upon the upward movements of the pistons.

Any suitable means may be utilized to actuate the pistons in accordance with the relative movements of the sprung and the unsprung masses of the vehicle. Preferably, as shown, a double-acting rocker arm 20, suitably mounted in the housing, is utilized to actuate the pistons by means of connecting links 22 and 23. As is usual practice, the rocker arm 20 is connected to the axle 26 (unsprung mass) by means of a lever arm 24 and a connecting link 27. However, it is to be understood that the housing 10 may, in some applications, be carried by the unsprung mass and the rocker arm be connected to the sprung mass but, in this description, the housing and the rocker arm will be considered, as connected to the sprung and the unsprung masses of a vehicle, respectively.

Therefore, as the sprung and the unsprung masses approach each other, as they will do after encountering an irregularity in the road surface, the piston 17 moves downwardly and the piston 16 upwardly and, when the masses move in the opposite directions, the piston 17 moves upwardly and the piston 16 downwardly. In this manner, the pistons 16 and 17 operate, to resist both the upward and the downward movements of the sprung mass.

The best riding qualities of the vehicle are attained when a shock absorber provides for resisting the relative movements of the sprung and the unsprung masses in accordance with the rate of change of the vertical velocities of the sprung mass. The truth of this statement is substantiated by the fact that a resisting force responsive to the rate of change of the vertical velocities of the sprung mass provides for materially lengthening the period of the free oscillations of the sprung mass as though an additional mass were added to the sprung mass for that part of the cycle during which the shock absorber is effective. This not only insures a smooth and easy movement to the sprung mass but also provides for reducing the resonance frequency of the movements of the sprung mass, whereby it is less likely to be influenced by the undulations of the road surface than it would be if the shock absorber did not function to alter the wave form.

In order to accomplish the foregoing, I provide for controlling the flow of the fluid from the piston chambers by utilizing a pair of inertia-controlled poppet valves $V_1$ and $V_2$. Although I have shown a pair of conical-faced poppet valves it is to be understood that I do not limit myself to this particular type of valve, since there are other types of valves that function substantially in the same manner. The valves may be mounted and operated in any suitable manner to control the flow of the fluid from the piston chambers. As shown, the valves are slidably mounted in valve guides 30 and 31 and are controlled by a pivotally mounted mass $M_1$, hereinafter called the control mass, supported by a coil spring 35. As shown in Fig. 1, the movement of the control-mass $M_1$ is relatively small. For this relatively small range of movement of the control-mass $M_1$, the change in the force of the supporting spring 35 is substantially negligible compared with the inertia force of the control-mass $M_1$. This allows substantially the full force of the control-mass $M_1$ to press against the valves $V_1$ and $V_2$. The valve guides 30 and 31 are provided with valve seats 38 and 39. By reason of the fact that the change in the force of the supporting spring 35 is substantially negligible compared with the inertia force of the control-mass $M_1$, the valves $V_1$ and $V_2$, when actuated by the movements of the control mass $M_1$, assume such position with respect to their valve seats 38 and 39 that, when the fluid is excluded from the piston chambers 16 and 17 through the opening of valves $V_1$ and $V_2$, a force is provided for resisting the relative movements of the sprung and the unsprung masses of the vehicle in accordance with the rate of change of the vertical velocities of the sprung mass. In this connection, it is to be observed that, when the sprung mass is vertically stationary, the mass $M_1$ is substantially balanced, and the valves $V_1$ and $V_2$ are open to provide a free-flow condition of the fluid, and, accordingly, the unsprung mass is substantially free to move relative to the sprung mass.

The valves $V_1$ and $V_2$ are designed to be influenced by the pressures in the compression chambers and are thus hydrostatically unbalanced valves, whereas, a hydrostatically balanced valve, for instance, a slide valve, is not influenced in the extent of its opening and closing by the pressure of the liquid flow the valve controls.

In order to subject the fluid in the chamber to a pressure that is proportional to the rate of change of the vertical velocities of the sprung mass, it is necessary that the fluid pressure, as well as the force of the control mass, shall influence the opening of the valves. Tests conducted on valves of different types disclose that a poppet valve, as shown in the embodiment of my invention, gives the best results, not only because it presents an area against which the fluid pressure in the piston chamber can act to overcome the force exerted by the control mass, but also because it provides a gradual opening as it moves relative to its seat.

In Fig. 3, I have shown a pair of coil springs 11 and 13 interposed between the mass $M_1$ and the ends of the valves $V_1$ and $V_2$. The springs 11 and 13 exert a relatively small force to hold the valves against their seats, and the pressure of the fluid in the piston chambers must build-up to such value to overcome the spring pressure before any fluid can flow through the valves when the control mass is not exerting a force against the valve. In this manner, the valves provide for resisting the relative movement of the sprung and the unsprung masses of the vehicle with a small substantially constant force when the rate of change of the vertical velocities of the sprung mass is constant or decreasing.

The screw plug 40 is provided so that the ports into which the valve guides 30 and 31 are screwed may be drilled and tapped during assembly.

The functioning of the shock absorber in response to the vertical movements of the sprung mass of the vehicle will now be described. Let it be assumed that the springs of the vehicle are compressed, as they will be after the vehicle passes over a raised portion of the road surface. Under this assumed condition, the springs of the vehicle will move the sprung mass upwardly, first with an increasing vertical velocity and then with a decreasing vertical velocity as the springs approach the end of their expansion, and then the sprung mass will move downwardly, first with an increasing vertical velocity and then with a decreasing vertical velocity as the springs approach the end of their second compression. The points where the increasing vertical velocity of the sprung mass changes to a decreasing vertical velocity will be designated as the balanced position of the sprung mass. (See points D, E and F of Fig. 2.) Likewise, that part of the cycle in which the sprung mass is moving upwardly with an increasing vertical velocity will be designated as the first quarter cycle, and that part in which the sprung mass is moving upwardly with a decreasing vertical velocity will be designated as the second quarter cycle, and that part in which the sprung mass is moving downwardly with an increasing vertical velocity will be designated as the third quarter cycle, and that part in which the sprung mass is moving downwardly with a decreasing vertical velocity will be designated as the fourth quarter cycle. (See Fig. 2.)

Let it be assumed again that the springs have been compressed and are now moving the sprung mass upwardly in the first quarter cycle. During this period, since the sprung mass is moving upwardly with an increasing vertical velocity, the movement of the mass $M_1$ will, therefore, lag behind the sprung mass and close the valve V₁. At the same time, it will be observed that the piston 16 is moving downwardly to subject the fluid to a pressure determined by the position of valve V₁ with respect to its seat 38. The position of the valve is determined by the relative values of the hydrostatic force exerted by fluid in the piston chamber 14 against the valve and the inertia-force exerted by the mass M₁ in the opposite direction. At the beginning of the first-quarter cycle, the inertia-force is large because the rate of change of the vertical velocity of the sprung mass is large and the valve V₁ is closed, but, immediately, the hydrostatic force of the fluid, under the action of the piston 16, builds up to a value equal to the inertia-force, thereby permitting some of the fluid to flow through the valve. Accordingly, the valve V₁ assumes such position relative to the valve seat 38 that the fluid in the piston chamber 14 is subjected to a pressure that is proportional to the rate of change of the increasing vertical velocity of the sprung mass. Therefore, the relative movements of the sprung mass and the unsprung mass of the vehicle during the first quarter cycle are resisted by a force that is large at the beginning of the quarter cycle and which gradually decreases to a small value as the sprung mass approaches the balanced position.

It is apparent that the greater the force tending to increase the vertical velocity of the sprung mass of the vehicle, the greater the resisting force of the shock absorber. The action of my device is such that it provides a resisting force that is a predetermined large fraction of the force tending to accelerate the sprung mass, thereby leaving only a predetermined small fraction to accelerate the sprung mass.

During the second-quarter cycle, since the sprung mass is moving upwardly with a decreasing vertical velocity, the movement of the mass M₁ will lead the movement of the sprung mass and open the valve V₁. Therefore, the relative movements of the sprung and the unsprung masses of the vehicle are resisted by a relatively small force, depending upon the free-flow condition of the fluid through the valve V₁. The free-flow condition may be changed to accommodate the various applications of the shock absorber. In other words, the free-flow condition may be constructed to permit substantially free relative movement of the sprung and the unsprung masses of the vehicle, or it may be such as to provide a small substantially constant force for resisting the relative movements of the sprung and the unsprung masses by means of springs, as shown in Fig. 3.

Let it be assumed now that the springs of the vehicle have reached the end of their expansion and that the movement of the sprung mass is downward in the third quarter cycle. During this quarter cycle, since the sprung mass is moving downwardly with an increasing vertical velocity, the movement of the mass M₁ will lag behind the movement of the sprung mass and close the valve V₂. At the same time, it will be observed that the piston 17 is moving downwardly to subject the fluid to a pressure determined by the position of the valve V₂ relative to its seat 39. As explained before in relation to the operation of the shock absorber in the first half cycle, the valve V₂ assumes such position relative to its seat 39 that the fluid in the piston chamber 17 is subjected to a pressure that is proportional to the rate of change of the downward increasing vertical velocity of the sprung mass. Therefore, the relative movements of the sprung and the unsprung masses during the third-quarter cycle are resisted by a force that is large at the beginning of the quarter cycle and which gradually decreases to a small force as the sprung mass approaches its balanced position.

During the fourth-quarter cycle, since the sprung mass is moving downwardly with a decreasing vertical velocity, the movement of the unsprung mass M₁ will lead the movement of the sprung mass and open the valve V₂. Therefore, during this quarter-cycle, the sprung and the unsprung masses of the vehicle are resisted by a relatively small force determined by the free-flow condition of the fluid through the valve V₂. Likewise, the free-flow condition of the valve V₂ may be constructed, in the same manner as that previously described for the valve V₁, to accommodate the various applications of the shock absorber.

In order to have efficient operation of a shock absorber, it is necessary that the springs of the vehicle shall be substantially free to expand when the wheels are passing over a depression in a road surface. In this connection, let it be assumed that the shock absorber is functioning to retard the upward movement of the sprung mass of the vehicle and that, during this time, the wheels encounter a depression in a road surface. Under this assumed condition, it will be observed that my shock absorber permits free movement of the springs in order to allow the wheels to fall into the depression. At the instant before the wheels encounter the depression, the valve V₁ is closed, since the sprung mass is moving upwardly with an increasing vertical velocity but, when the wheels fall into the depression, the upward increasing vertical velocity of the sprung mass changes either to an upward constant vertical velocity or to an upward decreasing vertical velocity (see point A, Fig. 2). In either of these cases, the movement of the mass M₁ will open the valve V₁, thus permitting the spring of the vehicle to be substantially free to expand when the wheels encounter a depression in the road surface.

Likewise, in order to have efficient operation of the shock absorber, it is necessary that the springs of the vehicle shall be substantially free to move when the wheels are passing over a raised portion of a road surface. Let it now be assumed that the shock absorber is functioning to retard a downward movement of the sprung mass of the vehicle and that, during this time, the wheels encounter a raised portion of a road surface. In this connection, it will be observed that my shock absorber permits free movement of the springs in order to allow the wheels to pass over a raised portion without subjecting the sprung mass to a jar. At the instant before the wheels encounter the raised portion of the road surface, the valve V₂ is closed, since the sprung mass is moving downwardly with an increasing vertical velocity, but, when the wheels encounter a raised portion, the downward increasing vertical velocity of the sprung mass changes either to a downward constant vertical velocity or to a downward decreasing vertical velocity (see point B, Fig. 2). In either of these cases, the movement of the mass M₁ will open the valve V₂, thus permitting the springs of the vehicle to be substantially free to move when the wheels encounter a raised portion of the road surface.

Therefore, my shock absorber functions to permit substantially free movement of the springs of the vehicle when the wheels encounter either a depression or a raised portion in the road surface, although at the instant previous to the wheels encountering the irregularities in the road surface, the shock absorber was functioning to retard relative movement of the sprung and the unsprung masses.

From the foregoing description of the operation and from Fig. 2, it is evident that my shock absorber provides for materially lengthening the period of the free oscillations of the sprung mass as though an additional mass were added to the sprung mass during the first and third quarter-cycles. A mass gives rise to a resisting force proportional to the rate of change of its velocity. My shock absorber also provides a resisting force proportional to the rate of change of the vertical velocities of the sprung mass during the first and third quarter-cycles and, therefore, produces an effect during these periods similar to that which an additional mass would produce. However, there is this distinction, namely, that the shock absorber provides for lengthening the period by dissipating the stored energy of the springs as heat, whereas the additional mass provides for changing the period not by the dissipation of energy but by the transformation of the potential energy of the springs into kinetic energy. During the second and fourth quarter-cycles, the duration is the same as it would be without any shock absorber, since the small resisting force is not proportional to the rate of change of the vertical velocities of the sprung mass.

Since the duration of the damping period of the sprung mass of a vehicle is much longer than what it normally would be without my shock absorber, the resonance frequency of the vertical movements of the sprung mass is much less. This means that the periodicity of the sprung mass is less likely to correspond to the undulations of the road surface, thereby preventing an increase in the amplitude of the vertical movements of the sprung mass caused by the sympathetic vibrations.

Therefore, I have described a shock absorber that provides for resisting the relative movements of the sprung and the unsprung masses of the vehicle by a force that is determined by the rate of change of the increasing vertical velocities of the sprung mass, said force being large when the rate of change is large and small when the rate of change is small. Also, I have described a shock absorber that provides for resisting the relative movements of the sprung and the unsprung masses of a vehicle by a small substantially constant force, depending upon the free-flow condition of the fluid during the periods when the vertical velocities of the sprung mass are constant or decreasing.

I state, in conclusion, that, while the illustrated example constitutes a practical embodiment of my invention, I do not limit myself strictly to the exact details herein illustrated, since various modifications of the same may be provided without departing from the spirit of the invention as defined in the appended claims.

I claim as my invention:

1. A shock absorber for vehicles of the type having a sprung and an unsprung mass comprising, in combination, means for resisting the relative movements of the masses by a force that is determined by the rate of change of the vertical velocities of the sprung mass during the periods when the vertical velocities of the sprung mass are increasing, said force being large when the said rate of change is large and small when the said rate of change is small, and means associated with the resisting means for causing the resisting means to resist the relative movements of the masses by a small substantially constant force during the periods when the vertical velocities of the sprung mass are decreasing.

2. A shock absorber for vehicles of the type having a sprung and an unsprung mass comprising, in combination, two relatively-movable elements actuated by the relative movements of the masses for subjecting a fluid to pressure, means influenced both by the movements of the sprung mass and by the fluid pressure for varying the said pressure during periods of increasing vertical velocities of the sprung mass in accordance with the rate of change of the vertical velocities of the sprung mass, and means for maintaining a small substantially constant pressure during periods of decreasing vertical velocities of the sprung mass.

3. A shock absorber for vehicles of the type having a sprung and an unsprung mass comprising, in combination, a chamber for containing a supply of fluid, a cylinder and a piston actuated by the relative movements of the masses for subjecting part of the fluid to pressure, a valve through which the fluid passes from the supply chamber into the piston chamber, a valve that is influenced by the fluid pressure through which valve the fluid passes as it flows from the piston chamber into the supply chamber, a control mass, and means for actuating the last-mentioned valve by said control mass.

4. A shock absorber for vehicles of the type having a sprung and an unsprung mass comprising, in combination, a chamber for containing a supply of fluid, a cylinder and a piston actuated by the relative movements of the masses for subjecting part of the fluid to pressure, a valve through which the fluid passes freely from the supply chamber into the piston chamber, and an inertia-controlled poppet valve through which the fluid passes from the piston chamber into the supply chamber.

5. A shock absorber for absorbing energy comprising, in combination, a chamber for containing a supply of fluid, a pair of cylinders provided within said chamber, a piston mounted in each cylinder and actuated by two relatively-movable masses, means through which the fluid passes freely from the supply chamber into the piston chambers, and a pair of inertia-controlled poppet valves through which the fluid passes from the piston chambers into the supply chamber.

6. A shock absorber for absorbing energy comprising, in combination, a low-pressure and a high-pressure fluid chamber, and means for transferring a fluid from the high-pressure chamber into the low-pressure chamber through an inertia-controlled poppet valve.

7. A shock absorber for absorbing energy comprising, in combination, a low-pressure fluid chamber, a pair of high-pressure fluid chambers, means for transferring a fluid from the high-pressure chambers into the low-pressure chamber through a pair of oppositely-disposed poppet valves, and an inertia controlled mass for actuating the poppet valves.

8. A shock absorber for absorbing energy comprising, in combination, a fluid containing piston chamber and a piston, means for actuating the piston, means for admitting the fluid into the piston chamber, and means, including an inertia-controlled poppet valve, for controlling the pressure of the fluid flowing from the piston chamber.

9. A shock absorber for absorbing energy comprising, in combination, a fluid containing cylinder and a piston, means for actuating the piston within the cylinder, means for admitting the fluid into the piston chamber, a hydrostatically unbalanced valve through which the fluid flows when leaving the piston chamber, a control mass for actuating the valve, the opening of said valve being influenced by the hydrostatic force exerted by the fluid against the valve.

10. A shock absorber for absorbing energy comprising, in combination, a pair of fluid chambers, means for admitting the fluid into the chambers, means for alternately forcing the fluid from the chambers, and means, including inertia-controlled valves, for controlling the pressure of the fluid flowing from the chambers, the opening of the said valves being influenced by the pressure of the fluid in the chambers.

11. In a system having two relatively movable masses, a shock absorber for absorbing energy by providing a resisting force comprising, in combination, two relatively movable coacting elements connected to the two relatively movable masses, and control means associated with the relatively movable coacting elements for controlling the magnitude of the resisting force, said control means including means influenced by the rate of change of the velocity of one of the masses and means influenced by the force between the two relatively movable coacting elements.

12. A shock absorber for absorbing energy comprising, in combination, a fluid containing chamber of variable volume, means through which fluid is admitted into said chamber, an inertia actuated valve through which the fluid is expelled from said chamber, the closing of said valve being resisted by the pressure of the fluid in said chamber.

13. A shock absorber for vehicles of the type having a sprung and an unsprung mass comprising, in combination, a fluid containing chamber and a piston, means for actuating the piston within the chamber, means for admitting the fluid into the piston chamber, a valve through which the fluid flows when leaving the piston chamber, a control-mass for actuating the valve, and resilient means associated with the valve for biasing the said valve towards its closed position.

14. A shock absorber comprising, in combination, a fluid containing chamber of variable volume, means through which fluid is admitted into said chamber, a poppet valve through which the fluid is expelled from said chamber, a control-mass, and a spring associated with said valve, said valve being controlled by both the control-mass and the spring.

15. A shock absorber for vehicles of the type having a sprung and an unsprung mass comprising, in combination, a fluid containing chamber of variable volume, means through which fluid is admitted into said chamber, a hydrostatically unbalanced valve through which fluid is expelled from said chamber, and a control-mass for controlling the said valve.

16. A shock absorber for vehicles of the type having a sprung and an unsprung mass comprising, in combination, a fluid containing chamber of variable volume, means through which fluid is admitted into said chamber, and means including an inertia-controlled poppet valve through which the fluid is expelled from said chamber.

17. In a fluid shock absorber, a fluid containing chamber of variable volume, a poppet valve for controlling the pressure of the fluid in said chamber substantially in proportion to a force which controls said poppet valve, a control-mass for controlling said poppet valve, and a flexible spring for so supporting the control-mass that the change in the force of the spring for the movements of the control-mass are substantially negligible compared with the inertia force of the control-mass, whereby substantially the full inertia force of the control-mass acts to control said poppet valve.

18. A shock absorber for absorbing energy, comprising, in combination, a fluid containing chamber of variable volume, means through which fluid is admitted into said chamber, conduit means through which the fluid flows when leaving said chamber, a valve, inertia responsive means adapted to act on said valve for controlling the flow of fluid through said conduit means, and resilient means continuously biasing said valve to closed position for also controlling the flow of fluid through said conduit means.

19. A shock absorber for absorbing energy, comprising, in combination, a fluid containing chamber of variable volume; means through which fluid is admitted into said chamber; a conduit through which the fluid flows when leaving said chamber; inertia means, comprising a valve, a weight, and a spring for holding the weight in a balanced position, for closing the conduit to resist the flow of fluid therethrough only in response to accelerations of the shock absorber, and resilient means comprising a valve and a spring for continuously biasing the valve to closed position, for closing the conduit to resist the flow of fluid therethrough.

20. A shock absorber for absorbing energy, comprising, in combination, a fluid containing chamber of variable volume, means through which fluid is admitted into said chamber, a valve through which the fluid is expelled from said chamber, and a control mass for actuating said valve, said control mass being adapted only to hold said valve closed.

21. A shock absorber for absorbing energy, comprising, in combination, a fluid containing chamber of variable volume, means through which fluid is admitted into said chamber, a valve disposed to be acted upon by said fluid to hold said valve open and through which the fluid is expelled from said chamber, a control mass for actuating said valve, said control mass being adapted to hold said valve closed to thus control the flow of fluid from said chamber.

22. A shock absorber comprising, in combination, a casing providing a fluid reservoir and a cylinder; a piston in said cylinder forming a compression chamber therein; a piston reciprocating member; a spring; a valve in the casing biased to closed position by said spring but which valve, in response to fluid pressure in the compression chamber, is thus adapted to establish a flow of fluid from said chamber; and means supported in the casing and adapted, in response to oscillations of said casing, to restrict said flow of fluid from the compression chamber.

23. In a fluid shock absorber, a fluid containing chamber, a valve adapted to control the pressure of the fluid in said chamber substantially in proportion to a force which controls said valve, a control-mass for controlling said valve, and resilient means acting on said control-mass, by a variable force during movements of said control-mass which variations are small relative to the inertia force of the control-mass when said mass is undergoing accelerations, whereby substantially the full inertia force of the control-mass acts on said valve.

24. A shock absorber for absorbing energy, comprising, in combination, a fluid containing chamber of variable volume, means through which fluid is admitted into said chamber, a conduit through which fluid flows when leaving said chamber, a mass adapted, during acceleration thereof, by reason of its inertia, to cause a closure of the conduit to resist the flow of fluid therethrough, and resilient means also adapted to cause a closure of the conduit to resist the flow of fluid therethrough.

25. A shock absorber for absorbing energy, comprising, in combination, a support, a fluid containing chamber of variable volume, a fluid supply reservoir, means through which fluid from said reservoir is admitted into said chamber, a conduit through which the fluid flows when leaving said chamber, inertia means adapted to cause a resistance to the flow of fluid through said conduit only when acted upon by a movement of said support, and continuously active resilient means also adapted to cause a resistance to the flow of fluid through said conduit.

26. A shock absorber for absorbing energy of two relatively movable masses comprising, in combination, a support, said support being mounted on one of the masses, a fluid containing chamber of variable volume, a fluid supply reservoir, means through which fluid from said reservoir is admitted into said chamber, conduit means through which the fluid flows when leaving said chamber, a mass adapted, during acceleration thereof only, by reason of its inertia alone, to cause a closure of the conduit means to restrict the flow of fluid through said conduit means, and resilient means, including a poppet valve and spring, adapted to restrict the flow of fluid through said conduit means.

27. A shock absorber for absorbing energy comprising, in combination, a fluid containing chamber of variable volume, means through which fluid is admitted into said chamber, a conduit through which fluid is expelled from said chamber, and fluid flow control means, including a spring and a mass, associated with said conduit, said spring acting continuously to close the conduit, and said mass acting during accelerations thereof only, by reason of its inertia, to close the conduit.

28. In an inertia controlled hydraulic shock absorber, a fluid pressure chamber, an outlet for said fluid pressure chamber, means associated with said outlet adapted to prevent, substantially entirely, the flow of fluid through said outlet until a definite fluid pressure is attained in said pressure chamber, said definite fluid pressure being small compared to the greatest pressure developed in said pressure chamber.

29. A shock absorber for vehicles of the type having a sprung and an unsprung mass comprising, in combination, two relatively movable elements activated by the relative movements of the masses for subjecting a fluid to pressure, means for causing an increase in the pressure during periods of increasing vertical velocities of said sprung mass, and means for causing a small minimum pressure to be maintained during periods of decreasing vertical velocities of the said sprung mass.

30. In an inertia controlled hydraulic shock absorber, a fluid pressure chamber, a conduit through which fluid flows when leaving said chamber, a valve means for closing said conduit to resist the flow of fluid through said conduit said valve means including a continuously acting spring, a control mass and a second spring for holding said control mass in a balanced position.

31. In an inertia controlled hydraulic shock absorber, in combination, a fluid pressure chamber, a conduit through which fluid flows when leaving said chamber, valve means for closing said conduit to resist the flow of fluid therethrough, said valve means including a continuously acting spring adapted to cause said conduit to be closed, and a control mass adapted during accelerations only, by reason of its inertia, to cause said conduit to be closed.

32. A shock absorber for a vehicle, comprising an element connectible with the body of the vehicle for movement therewith; a second element connectible and movable with the axle of the vehicle; means interposed between the elements and governed by fluid pressure established by movement of the axle connected element or both of said elements for checking abnormal movement thereof; and means governed by the movement of said body connected element for controlling the operation of said aforementioned means.

33. A shock absorber comprising, in combination, a casing; means for circulating fluid within said casing; pressure operated means adapted to prevent said circulation until a predetermined pressure is attained; and means adapted to regulate the circulation of the fluid established by said pressure operated means in accordance with the movement of said casing.

34. A shock absorber for a vehicle, comprising, in combination, an element connectible with the body of the vehicle for movement therewith; a second element connectible and movable with the axle of the vehicle; means interposed between the elements and governed by fluid pressure established by the movement of the axle connected element for checking movement thereof; and means governed by the movement of said body connected element for controlling the operation of said aforementioned means.

35. In an inertia controlled hydraulic shock absorber, a fluid containing chamber having an outlet, valve means in said outlet for determining the pressure of the fluid in said chamber, said valve means providing, for one operating condition, for a low minimum pressure which must be exceeded before fluid may flow from said chamber, and providing also for another operating condition for a variable higher pressure than the lower minimum pressure to thus regulate the amount of fluid that may flow from the fluid containing chamber.

CLINTON R. HANNA.